United States Patent
Paek et al.

(10) Patent No.: US 8,244,545 B2
(45) Date of Patent: Aug. 14, 2012

(54) DIALOG REPAIR BASED ON DISCREPANCIES BETWEEN USER MODEL PREDICTIONS AND SPEECH RECOGNITION RESULTS

(75) Inventors: Timothy S. Paek, Sammamish, WA (US); David M. Chickering, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1404 days.

(21) Appl. No.: 11/393,321

(22) Filed: Mar. 30, 2006

(65) Prior Publication Data

US 2007/0233497 A1    Oct. 4, 2007

(51) Int. Cl.
*G10L 21/00* (2006.01)

(52) U.S. Cl. .......................................... 704/277

(58) Field of Classification Search .................. 704/270, 704/277
See application file for complete search history.

(56) References Cited

U.S. PATENT DOCUMENTS

| | | | |
|---|---|---|---|
| 5,040,214 A | 8/1991 | Grossberg et al. | |
| 5,588,044 A * | 12/1996 | Lofgren et al. | 379/67.1 |
| 5,842,161 A | 11/1998 | Cohrs et al. | |
| 5,960,394 A * | 9/1999 | Gould et al. | 704/270.1 |
| 5,983,179 A * | 11/1999 | Gould | 704/270.1 |
| 5,999,904 A * | 12/1999 | Brown et al. | 704/272 |
| 6,233,570 B1 | 5/2001 | Horvitz et al. | |
| 6,253,177 B1 | 6/2001 | Lewis et al. | |
| 6,405,170 B1 * | 6/2002 | Phillips et al. | 704/270 |
| 6,510,411 B1 * | 1/2003 | Norton et al. | 704/254 |
| 6,526,382 B1 * | 2/2003 | Yuschik | 704/275 |
| 6,839,669 B1 * | 1/2005 | Gould et al. | 704/246 |
| 6,865,528 B1 | 3/2005 | Huang et al. | |
| 7,085,716 B1 * | 8/2006 | Even et al. | 704/235 |
| 7,689,420 B2 | 3/2010 | Paek et al. | |
| 7,707,131 B2 | 4/2010 | Chickering et al. | |
| 2002/0143540 A1 | 10/2002 | Malayath et al. | |
| 2003/0115062 A1 * | 6/2003 | Walker et al. | 704/258 |
| 2003/0139925 A1 | 7/2003 | Anderson et al. | |

(Continued)

OTHER PUBLICATIONS

S.M. Williams, et al., "Using Speech Recognition Technology to Enhance Literacy Instruction for Emerging Readers", Fourth International Conference of the Learning Sciences, 2000, pp. 115-120, Mahwah, NJ: Erlbaum.

(Continued)

*Primary Examiner* — Michael N Opsasnick
(74) *Attorney, Agent, or Firm* — Lee & Hayes, PLLC

(57) ABSTRACT

An architecture is presented that leverages discrepancies between user model predictions and speech recognition results by identifying discrepancies between the predictive data and the speech recognition data and repairing the data based in part on the discrepancy. User model predictions predict what goal or action speech application users are likely to pursue based in part on past user behavior. Speech recognition results indicate what goal speech application users are likely to have spoken based in part on words spoken under specific constraints. Discrepancies between the predictive data and the speech recognition data are identified and a dialog repair is engaged for repairing these discrepancies. By engaging in repairs when there is a discrepancy between the predictive results and the speech recognition results, and utilizing feedback obtained via interaction with a user, the architecture can learn about the reliability of both user model predictions and speech recognition results for future processing.

19 Claims, 11 Drawing Sheets

U.S. PATENT DOCUMENTS

| | | |
|---|---|---|
| 2003/0220791 A1 | 11/2003 | Toyama |
| 2004/0220809 A1 | 11/2004 | Wang et al. |
| 2004/0243412 A1 | 12/2004 | Gupta et al. |
| 2004/0243419 A1 | 12/2004 | Wang |
| 2005/0055210 A1 | 3/2005 | Venkataraman et al. |
| 2005/0102141 A1 | 5/2005 | Chikuri |
| 2005/0131699 A1 | 6/2005 | Fukada |
| 2007/0239453 A1 | 10/2007 | Paek et al. |

OTHER PUBLICATIONS

J. Dalby, et al., "Explicit Pronunciation Training Using Automatic Speech Recognition Technology", Calico Journal, 1999, vol. 16, No. 3, pp. 425-446.

Cory D. Kidd, et al., "Building a Better Intercom: Context-Mediated Communication within the Home", GVU Technical Report 00-27, 2000, 8 pages, Georgia Institute of Technology College of Computing, Atlanta, GA, USA.

* cited by examiner

DIALOG REPAIR BASED ON DISCREPANCIES BETWEEN USER MODEL PREDICTIONS AND SPEECH RECOGNITION RESULTS

BACKGROUND

Speech recognition applications have been commonplace in telephony and accessibility systems for many years, however only recently have mobile devices had the memory and processing capacity to support not only speech recognition, but a whole range of multimedia functionalities that could be controlled by speech.

Furthermore, the ultimate goal of the speech recognition (or dialog) technology is to be able to produce a system that can recognize with 100% accuracy all words that are spoken by any person. However, even after years of research in this area, the best speech recognition software applications still cannot recognize speech with 100% accuracy. For example, some applications are able to recognize over 90% of the words when spoken under specific constraints regarding content and previous training to recognize the speaker's speech characteristics, while others recognize a significantly lower percentage. Accordingly, statistical models that can predict commands based in part on past user behavior, have been developed to function in combination with the speech recognition application to improve the accuracy of speech recognition. These statistical models can be used in combination with user speech commands to improve dialog performance of the speech recognition applications.

Unfortunately, oftentimes the results of the speech commands and the predictive statistical models can differ. Discrepancies can occur between the speech command results and the statistical model results when the statistical model predicts one goal (or intended result) and the speech command predicts a different goal. When this situation arises, it may be advantageous for a speech recognition application to engage in a dialog repair process so as to learn which result is more reliable.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The invention disclosed and claimed herein, in one aspect thereof, comprises a dialog system that leverages discrepancies between user model predictions and speech recognition results for repairing dialog data. The dialog system can comprise a discrepancy detection component for identifying discrepancies between predictive dialog data output from a user model prediction component and recognized dialog data output from a speech recognition component.

The user model prediction component predicts what goal or action speech application users are likely to pursue given various components of a speech application. These predictions are based in part on past user behavior displayed by the user. The speech recognition component processes the input speech signals and returns a result indicating what goal speech application users are likely to have spoken. These results are based in part on words spoken under specific constraints regarding content and previous training to recognize the speaker's speech characteristics.

As the user model prediction component produces results based on past user behavior and the speech recognizer component produces results based on speech signals the users are likely to have spoken, discrepancies can occur between speech recognition results and user model predictions. Based on the discrepancies identified between the speech recognition results and the predictive results, a dialog repair component is engaged for repairing the dialog data. By engaging in repairs when there is a discrepancy between the predictive results and the speech recognition results, the dialog system can learn about the reliability of both the user model prediction component and speech recognition component for future processing.

In another aspect of the subject invention, the results predicted by the user model prediction component and the results recognized by the speech recognition component are treated as expert opinions. Each result is viewed as an opinion from a different expert, and if there is a discrepancy between the experts, the dialog system engages in confirmation processing to decide which expert is correct. Once it is determined which expert is correct based on the user feedback, the dialog system engages the dialog repair component to repair the discrepancy. Thus, user feedback elicited from the dialog repair is used to weight one expert more than the other.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
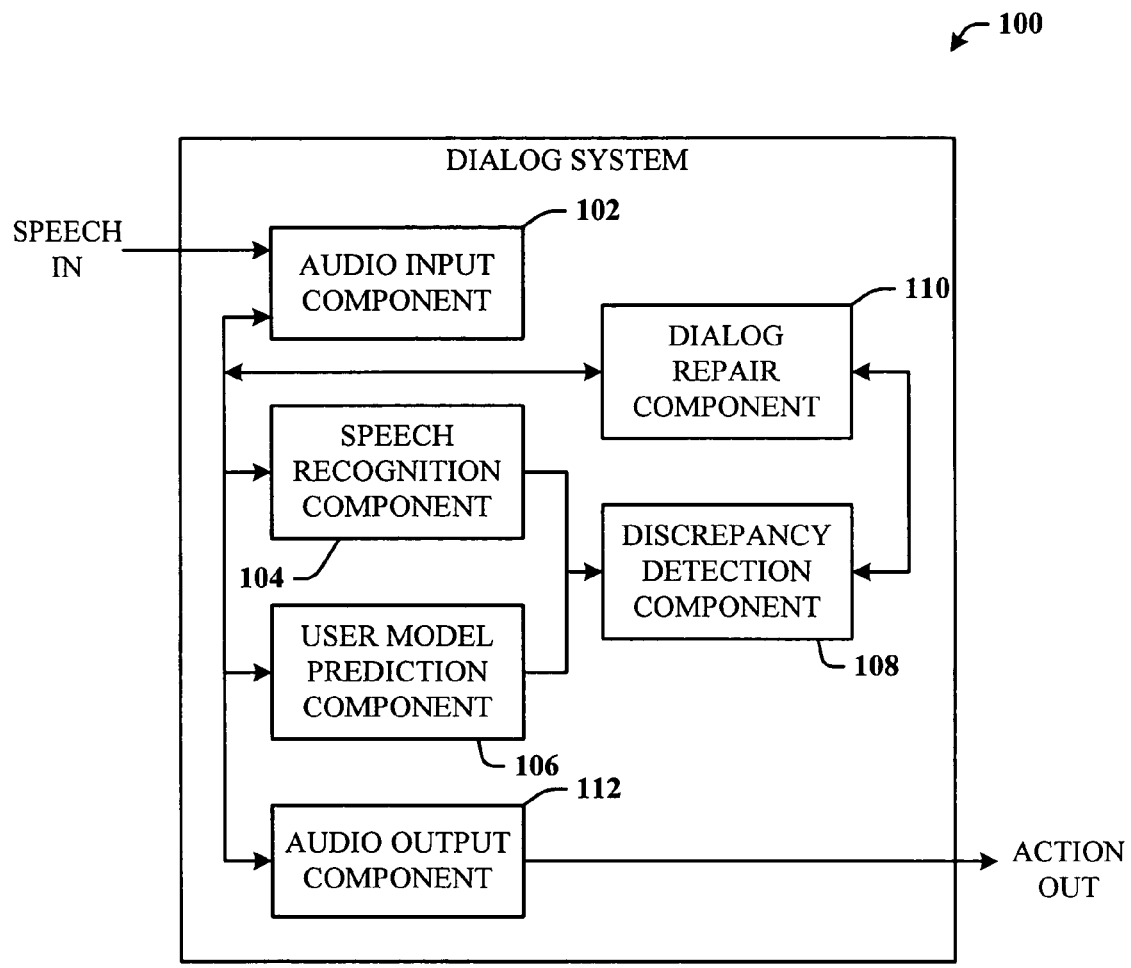
FIG. 1 illustrates a block diagram of a dialog system.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component," "handler," "model," "system," and the like are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Additionally, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer-readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Speech recognition applications, such as command and control (C&C) speech recognition applications allow users to interact with a system by speaking commands or asking questions. Statistical models that can predict commands based in part on past user behavior, have been developed to function in combination with the speech recognition application. These statistical models are used in combination with user speech commands to improve the performance of the speech recognition applications. However, the use of both speech recognition results and statistical prediction models in speech applications can produce differing results. The invention provides a dialog system that leverages the discrepancies between user model predictions and speech recognition results.

User models predict what goal or action speech application users are likely to pursue given various components of a speech application. These predictions are based in part on past user behavior (e.g., systematic patterns of usage displayed by the user). For example, a user model determines that a user calls a spouse at the end of every work day, so the predictive user model weights the spouse more than other contacts during that time of day. Speech recognition results indicate what goal users are likely to have spoken. These results are based in part on words spoken under specific constraints regarding content and previous training to recognize the speaker's speech characteristics. Thus, discrepancies can occur between speech recognition results and user model predictions when the user model predicts one goal and the most likely speech recognition result is a different goal.

Leveraging discrepancies between the user model predictions and speech recognition results by engaging in a dialog repair is desirable. For example, the architecture can utilize real time weighting of the reliability of the user model and/or the speech recognizer to optimize recognition capabilities. Further, based on the discrepancies identified, the architecture can also tune the user model and/or the speech recognizer as needed. Because the deficiencies of the user model and/or speech recognizer have been identified, this tuning can be used to further improve the models in particular area(s) (e.g., areas where deficiencies have been identified). By engaging in repairs when there is a discrepancy between the user model and the speech recognizer, the dialog system can learn about the reliability of either the user model or the speech recognizer. Accordingly, following is a description of systems, methodologies and alternative embodiments that implement the architecture of the subject innovation.

Referring initially to the drawings, FIG. 1 illustrates a dialog system 100 that facilitates the leveraging of discrepancies in accordance with an innovative aspect. The dialog system 100 includes an audio input component 102 that takes as input raw voice/speech signals. The raw voice/speech signals are typically spoken commands or questions restricted to fixed, grammar-containing, pre-defined phrases. A speech recognition component 104 processes the input speech signals and returns a result indicating what goal speech application users are likely to have spoken. This goal can be a whole range of multimedia functionalities that could be controlled by speech, such as opening a specific file, downloading a specific music file, calling a specific person, etc. These results are based in part on words spoken under specific constraints regarding content and previous training to recognize the speaker's speech characteristics. Typically, the speech recognition component 104 takes as input the speech signals from the audio input component 102 and outputs an action/multimedia functionality for the speech recognition application to perform.

The dialog system 100 further includes a user model prediction component 106. The user model prediction component 106 predicts what goal or action speech application users are likely to pursue given various components of a speech application. These predictions are based in part on past user behavior (e.g., systematic patterns of usage displayed by the user). Mobile devices, and in some regards computing devices, are mainly used just by the owner. Owners typically personalize their devices with specific backgrounds, skins, ring tones, etc. Further, people generally tend to be creatures of habit, so individual users tend to display systematic patterns of usage for their personal devices. Given the personal nature of mobile devices and/or computing devices, this personal information can be modeled with machine learning techniques to create predictive user models. These predictive user models can be used in combination with the speech recognition results to improve the performance of the speech recognition application. Typically, the predictive user model component 106 takes as input the speech results from the speech recognition component 104 and outputs a predictive result. Based on the speech recognition results from the speech recognition component 104 and the predictive results from the predictive user model component 106, an audio output component 112 then processes the combined results and outputs speech and/or an action/multimedia functionality for the speech recognition application to perform.

As the user model prediction component 106 produces results based on past user behavior and the speech recognizer component 104 produces results based on speech signals the users are likely to have spoken, discrepancies can occur between speech recognition results and user model predictions. For example, discrepancies can be based on a difference in the most likely user goal (e.g., when the user model predicts one goal and the most likely speech recognition result is a different goal). Discrepancies can also be based on a measure of reliability, such as a probability, confidence score, potential functions, etc. In one implementation, weighted values are assigned to certain words depending on such factors as complexity, pronunciation, amount of syllables, etc. The weighted values determine the reliability that the speech recognition results are correct (e.g., match the user's speech input).

Furthermore, user feedback is also utilized to determine the reliability of the speech recognition results and/or the user model predictions. Specifically, user feedback is utilized to learn if the user model predictions are correct, the speech recognition results are correct, and/or both the user model predictions or the speech recognition results are incorrect. If both the user model predictions and the speech recognition results are determined to be incorrect, then the dialog system learns that neither source is reliable. User feedback occurs as an expected consequence of taking a system action and can include an explicit user action and/or a tacit acceptance of an action.

Discrepancies are then detected by the discrepancy detection component 108. The discrepancy detection component 108 determines the differences in results between components 104 and 106 and/or associates the results with a measure of reliability.

A dialog repair component 110 then processes the differences in results between the components 104 and 106 and/or the measure of reliability detected by the discrepancy detection component 108 and engages in a dialog repair. A dialog repair process typically involves weighting one component more than the other in terms of reliability and/or tuning the components based on the discrepancies detected. For example, the dialog system 100 can utilize realtime weighting of the reliability of the user model component 106 and/or the speech recognition component 104 to optimize recognition capabilities. Further, based on the discrepancies identified, the dialog system 100 can also tune the user model component 106 and/or the speech recognition component 104 as needed.

Because the deficiencies of the user model component 106 and/or speech recognition component 104 have been identified, this tuning can be used to further improve the models 104 and 106 in particular area(s) (e.g., areas where deficiencies have been identified). By engaging in repairs when there is a discrepancy between the user model prediction results and the speech recognition results, the dialog system 100 can learn about the reliability of both the user model prediction component 106 and speech recognition component 104 for future processing. For example, if the speech recognition results continually differ with the user model predictions and user feedback determines that the speech recognition results are incorrect every time a discrepancy occurs, then a speech application user would learn that the speech recognition component 104 is unreliable and would place more weight on the results of the user model component 106 and/or would tune the speech recognition component 104. Further, once the discrepancies are identified and a repair is made, an audio output component 112 processes the updated results and outputs speech and/or an action/multimedia functionality for the speech recognition application to perform.

In another implementation, the results predicted by the user model prediction component 106 and the results recognized by the speech recognition component 104 are treated as expert opinions. Each result is viewed as an opinion from a different expert, and if there is a discrepancy between the experts, the dialog system 100 engages in confirmation processing to decide which expert is correct. Once it is determined which expert is correct, the dialog system 100 engages the dialog repair component 110 to repair the discrepancy.

For example, assume a speech application user has multiple media items on their personal computing device but has never played a song by Madonna. The speech recognition component 104 processes the utterance "Play Madonna", the dialog system 100 would then engage in a confirmation, such as "Did you want to play Madonna?" to discern whether the speech recognition component was correct. If the user responds "Yes," then the dialog system 100 can update its user model prediction component 106 to reflect such changes in the user's behavior. If the user responds "No," then the dialog system 100 learns that the speech recognition component 104 may not be reliable in certain circumstances. Accordingly, user feedback elicited from the dialog repair is used to weight one expert more than the other. Typically, the dialog system 100 will gradually accumulate information on the reliability of the speech recognition component 104 until a predetermined threshold is met, such as a reliability of greater than 80%. Once this predetermined threshold requirement is met, then the dialog system 100 need no longer engage in a confirmation, but will instead rely on the results of the speech recognition component 104.

Figure 2:
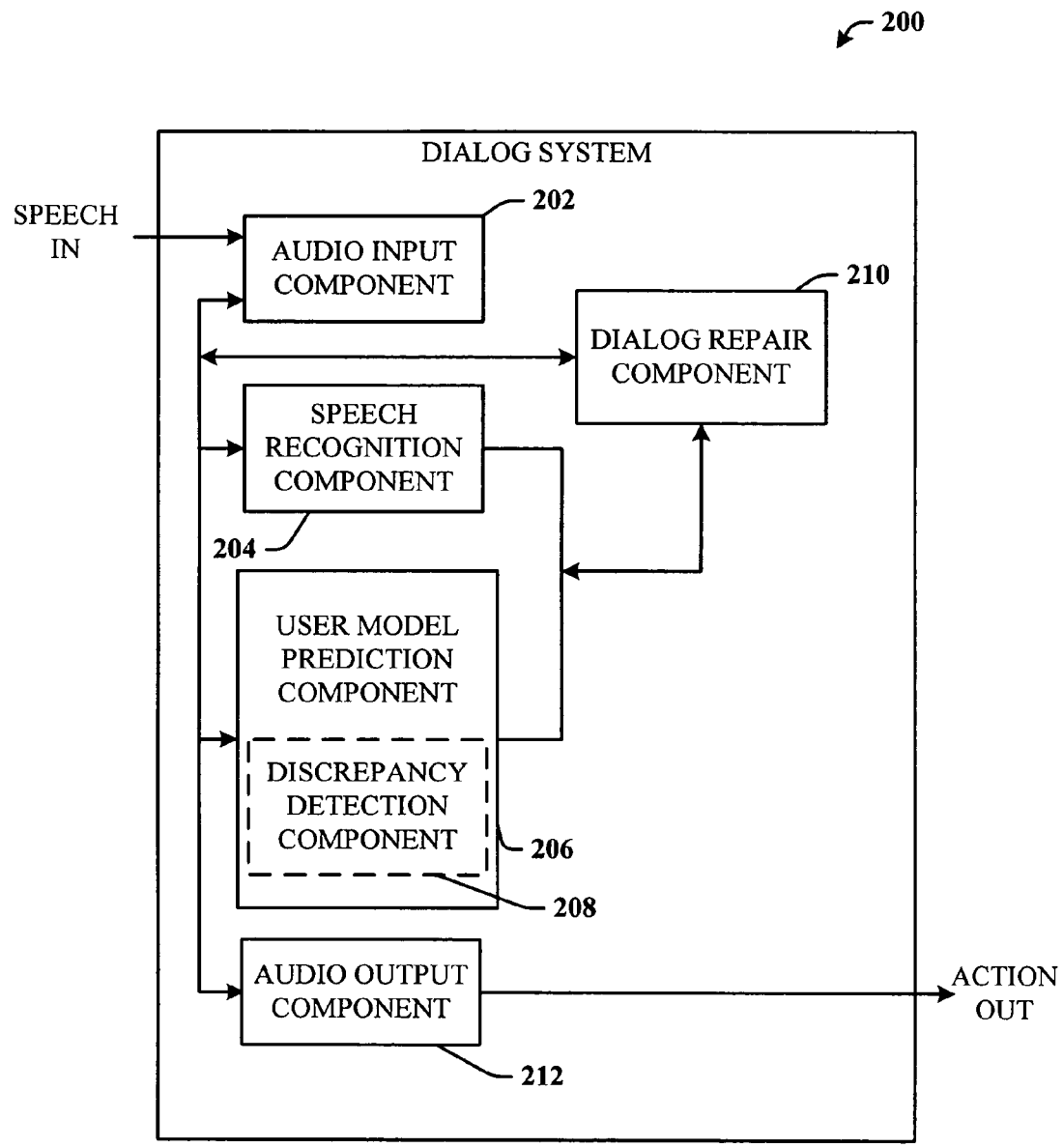
FIG. 2 illustrates a block diagram of the dialog system wherein the discrepancy detection component is integral to the user model prediction component.

In another implementation illustrated in FIG. 2, a discrepancy detection component 208 is integral to the user model prediction component 206 in dialog system 200. By incorporating the discrepancy detection component 208 directly into the predictive user model component 206 and/or into the speech recognition component 204 (not shown), the discrepancy detection component 208 can identify discrepancies and request user feedback. The dialog repair component 210 can then utilize user feedback to update modifiable parameters and structures of the user model prediction component 206 or speech recognition component 204 in an online fashion. Accordingly, the dialog repair component 210 can directly repair the user model prediction component 206 and/or speech recognition component 204 based on user feedback.

Figure 3:
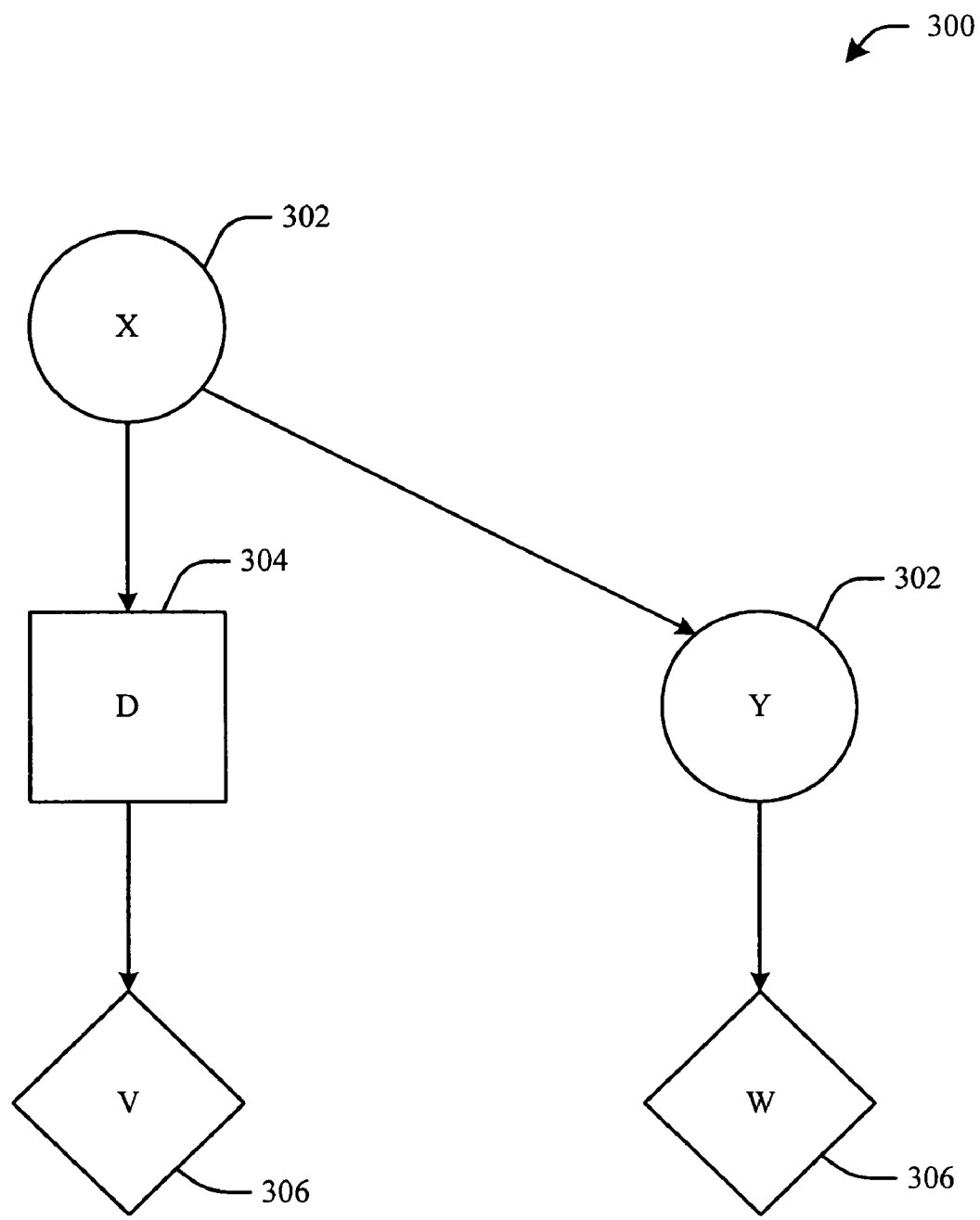
FIG. 3 illustrates an influence diagram for leveraging the discrepancies of the dialog system.

In another implementation, the discrepancy detection component 108 (of FIG. 1) is incorporated as a component for probabilistic dialog management, such as an influence diagram illustrated in FIG. 3. An influence diagram is a graphical model defined over a domain consisting of three types of variables: chance variables U, decision variables D, and value variables V. The influence diagram also contains a single utility function that is a deterministic function of all of the value variables. An influence diagram contains a set of parameters $\Theta$ that characterize the conditional distributions of the non-decision variables. In particular, the diagram defines the probability distribution p(U, V|D, Θ) via the local distributions stored within the non-decision nodes:

$$p(U, V \mid D, \Theta) = \prod_{X \in U \cup V} p(X \mid \text{Pa}(X), \Theta_X)$$

where Pa(X) denotes the set of parents for node X, and where $\Theta_X$ denotes the subset of parameters in Θ that define the local distribution of X. Parents of a decision node D represent the nodes for which the values will be known at the time decision D is made.

Referring briefly again to FIG. 3, an exemplary influence diagram 300 is illustrated. In this example, circular nodes 302 represent chance variables, square nodes 304 represent decision variables, and diamond nodes 306 represent value variables. Accordingly, in this implementation the discrepancies identified between the user model prediction component and the speech recognizer would be chance variables 302.

If the parameters Θ of an influence diagram are known with certainty, well-studied inference techniques can be applied to "solve" for the optimal sequence of decisions represented in that diagram. In particular, corresponding to each setting θ of the parameters is an optimal policy π(Θ) that prescribes, for each decision node in the influence diagram, what the best choice is as a function of the values of the observed variables. In one example, the policy π(Θ) is not constructed explicitly, but rather as each decision needs to be made, an inference algorithm is run to determine the best action to take.

Accordingly, the dialog system 100 of FIG. 1 can be employed in scenarios in which an influence diagram is used to make repeated decisions and maximization of long-term expected utility is desired. An influence diagram can be utilized in leveraging of a dialog system 100 due to the fact that interactions at each step in the leveraging process can vary significantly. Specifically, for dialog repair components 110 in general, the set of actions that are appropriate at each step in the repair may be varied.

FIGS. 4-9 illustrate methodologies of leveraging discrepancies between user model predictions and speech recognition results according to various aspects of the innovation. While, for purposes of simplicity of explanation, the one or more methodologies shown herein (e.g., in the form of a flow chart or flow diagram) are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Figure 4:
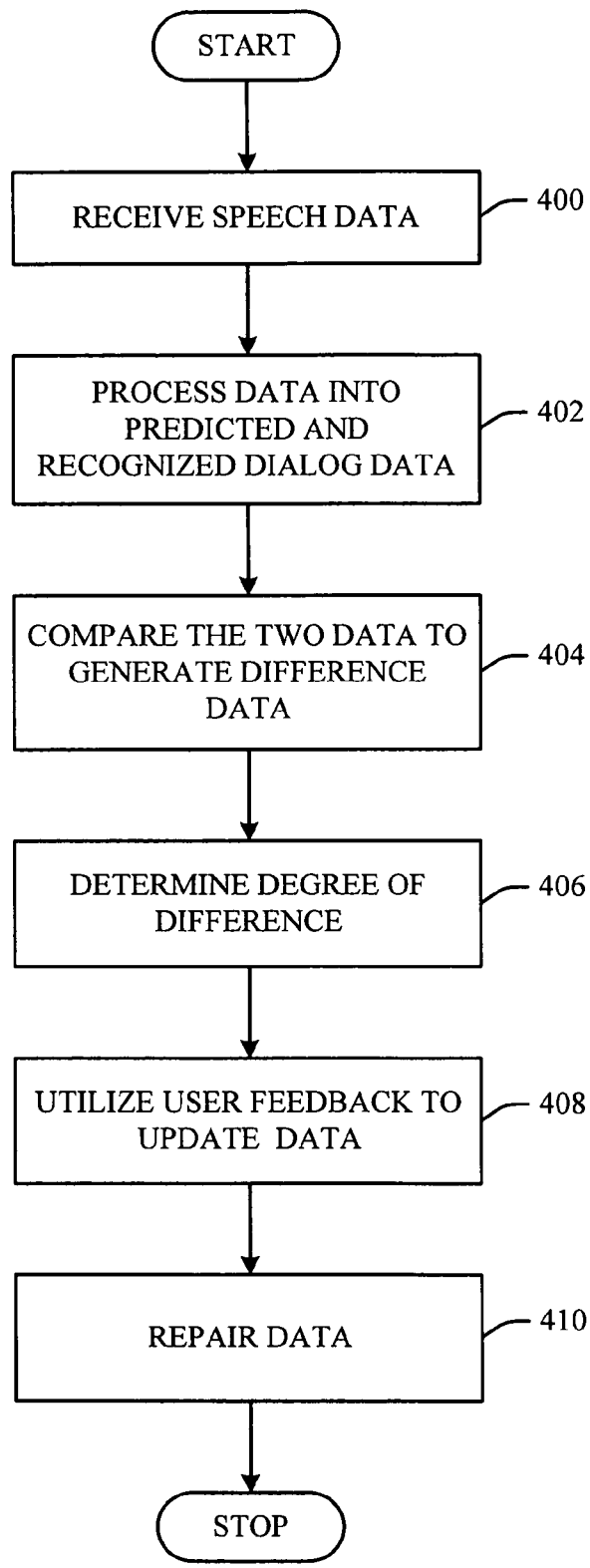
FIG. 4 illustrates a flow chart of a method of a dialog system.

Referring to FIG. 4, a method of leveraging the discrepancies of a dialog process is illustrated. At 400, the dialog process receives speech/dialog data. The speech/dialog data includes, but is not limited to, spoken commands and/or questions restricted to fixed, grammar-containing, pre-defined phrases, spoken utterances and utterances vocalized to music, as well as predictive data based on systematic patterns of usage displayed by the user, etc. It is thus to be understood that any suitable audible output that can be vocalized by a user is contemplated and intended to fall under the scope of the hereto-appended claims. At 402, the speech/dialog data is processed into predicted dialog data and recognized dialog data. Predicted dialog data is typically data accumulated based in part on past user behavior (e.g., systematic patterns of usage displayed by the user so as to predict what goal or action users are likely to pursue).

Recognized dialog data is typically data generated from spoken commands or questions that indicates what goal users are likely to have spoken. At 404, the predicted and recognized dialog data are compared to generate difference data. Difference data represents the identified discrepancies between the predicted dialog data and the recognized dialog data. Specifically, difference data is generated when the predicted dialog data as processed predicts one goal and the most likely speech recognition result from the recognized dialog data is a different goal. Difference data can also be generated by processing the predicted dialog data and the recognized dialog data as a measure of reliability, such as a probability, confidence score, potential functions, etc. For example, the dialog data can be processed according to the probability that the predicted dialog data is correct, the recognized dialog data is correct and/or both the predictive dialog data and the recognized dialog data are incorrect. If both the predictive dialog data and the recognized dialog data are determined to be incorrect, then the dialog process learns that neither source is reliable.

At 406, the difference data is processed to determine a degree of difference between the predictive dialog data and the recognized dialog data. The degree of difference between the predictive dialog data and the recognized dialog data determines the need for a dialog data repair. As stated above, the degree of difference can be based on the difference in goals from the predicted dialog data and the most likely speech recognition result, as well as can be based on a measure of reliability. At 408, user feedback is utilized to determine if the predictive dialog data and/or the recognized dialog data need to be updated. User feedback occurs as an expected consequence of taking a system action and is obtained in various ways, such as explicitly through a confirmation process, through a user's rejection of specific actions, implicitly through a tacit acceptance of actions, etc. The predictive dialog data and/or the recognized dialog data is also updated when the degree of difference meets a predetermined threshold value in order to repair the dialog data. A predetermined threshold value is set by the dialog process to determine when a dialog repair is needed. For example, as the difference data is processed the degree of difference is determined, when the degree of difference reaches the predetermined threshold value, a dialog repair process is engaged and the predicted dialog data and/or the recognized dialog data is repaired. At 410, the dialog data is repaired via engaging in repairs of the predicted dialog data and/or the recognized dialog data. By engaging in repairs when there is a discrepancy between the predicted dialog data and recognized dialog data, the dialog process can learn about the reliability of both the predicted dialog data and the recognized dialog data.

Figure 5:
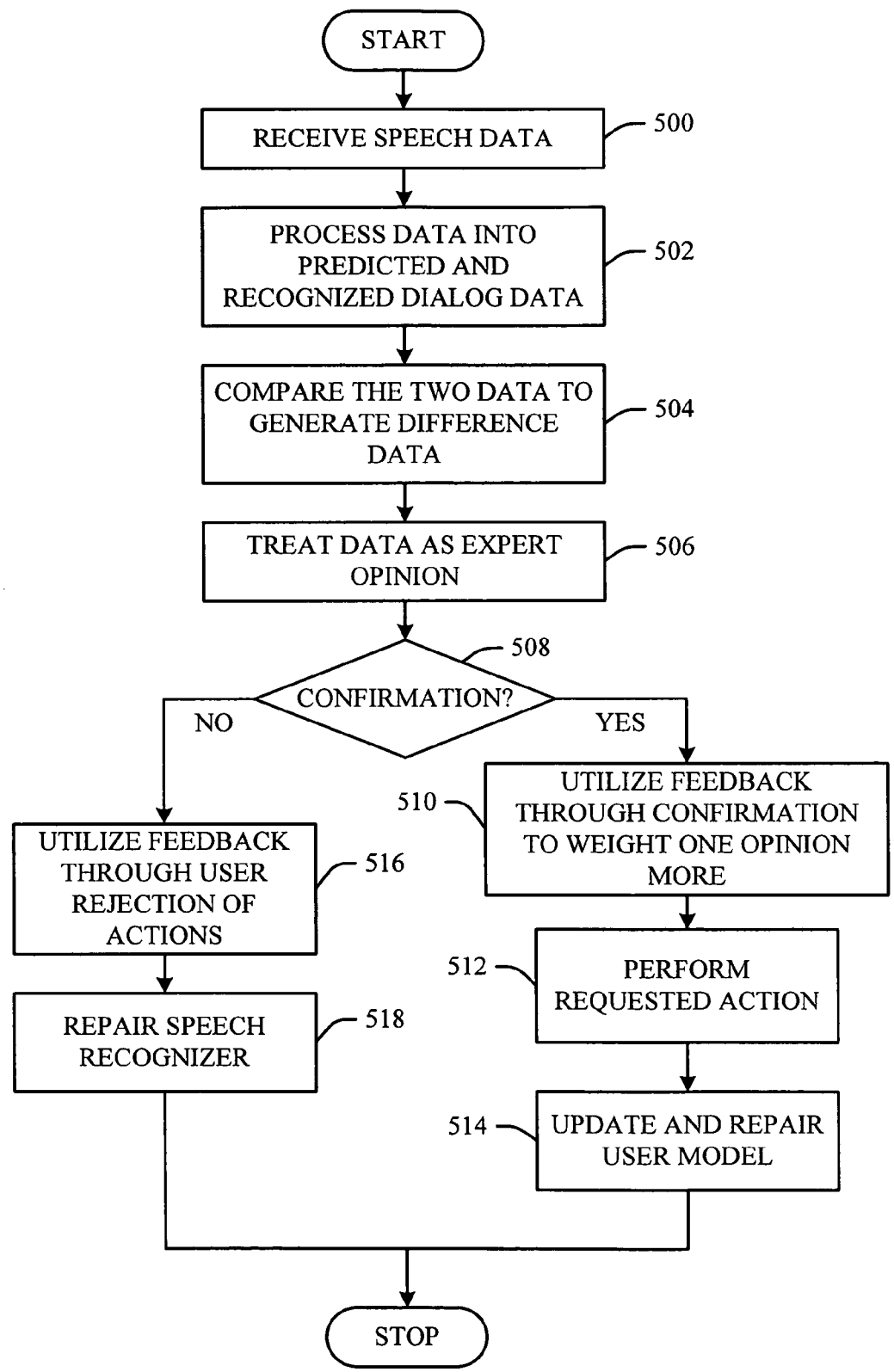
FIG. 5 illustrates a flow chart of a method of the dialog system further including confirmation processing.

Referring to FIG. 5, a method of leveraging the discrepancies of a dialog process is illustrated. At 500, the dialog process receives speech/dialog data. Speech/dialog data is typically spoken commands and/or questions restricted to fixed, grammar-containing, pre-defined phrases, as well as predictive data based on systematic patterns of usage displayed by the user. At 502, the speech/dialog data is processed into predicted dialog data and recognized dialog data. Predicted dialog data is typically data accumulated based in part on past user behavior so as to predict what goal or action users are likely to pursue. Recognized dialog data is typically data generated from spoken commands or questions that indicates what goal users are likely to have spoken. At 504, the predicted and recognized dialog data are compared to generate difference data. Difference data is the identified discrepancies between the predicted dialog data and the recognized dialog data. Specifically, difference data is generated when the predicted dialog data as processed predicts one goal and the most likely speech recognition result from the recognized dialog data is a different goal. Difference data can also be generated by processing the predicted dialog data and the recognized dialog data as a measure of reliability.

At 506, the predicted dialog data and the recognized dialog data are treated as expert opinions. Each result is viewed as an opinion from a different expert, and if there is a discrepancy between the experts, the dialog process engages in confirmation processing to decide which expert is correct. As stated supra, difference data represents the identified discrepancies between the experts. Thus, if there is a discrepancy between the experts, difference data can be generated. Once the difference data is generated, the dialog process can engage in a confirmation at 508. If the user responds in the affirmative to the confirmation, then at 510 the dialog process will utilize the user feedback as obtained through the confirmation process to weight the recognized dialog data expert opinion more than the predicted dialog data expert opinion. At 512, the requested action is performed. Based in part on the user confirmation, the recognized dialog data is processed and the requested action is identified and performed. At 514, the dialog process repairs and updates the predictive dialog data. If the user responds in the negative to the confirmation, then at 516 the dialog process will utilize the user feedback as obtained through the explicit user rejection of the action to not perform the action as identified by the recognition dialog data. At 518, the dialog process learns that the recognized dialog data is unreliable and engages in a repair. By engaging in repairs when there is a discrepancy between the predicted dialog data expert opinion and the recognized dialog data expert opinion, the dialog process can learn about the reliability of both the predicted dialog data expert opinion and the recognized dialog data expert opinion and weight one expert opinion more than the other.

Figure 6:
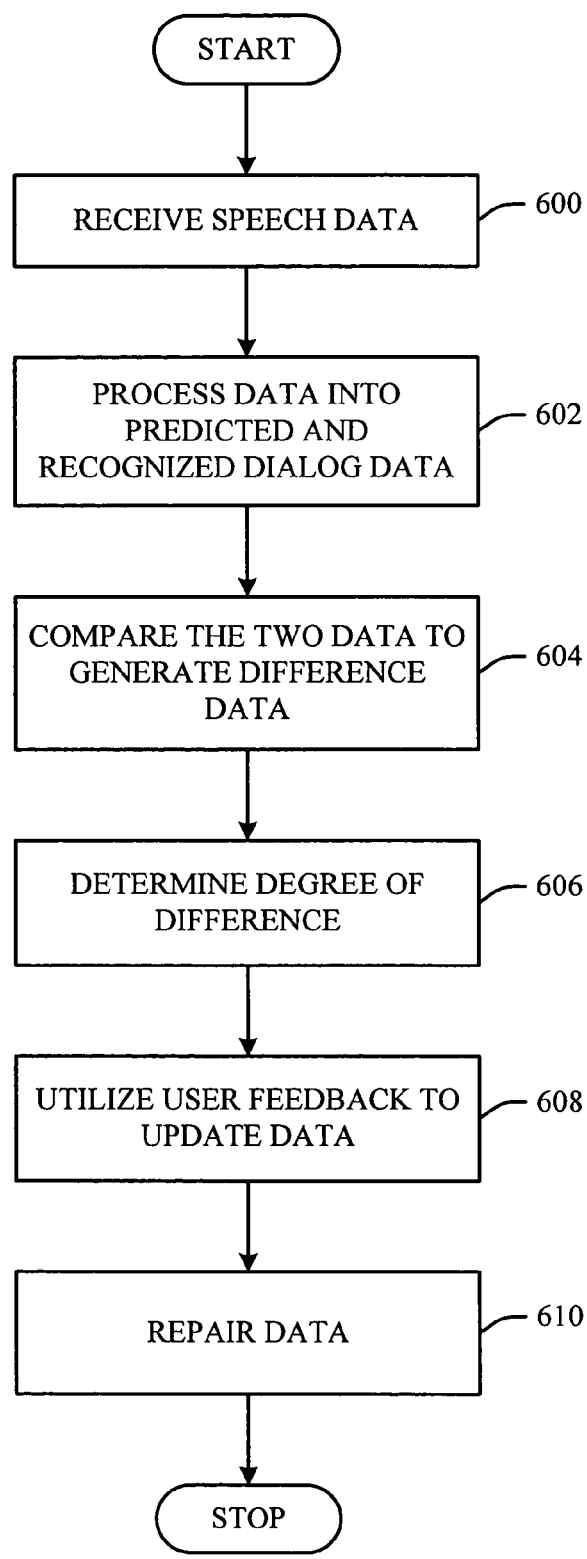
FIG. 6 illustrates a flow chart of a method of the dialog system wherein the discrepancy detection component is integral to the user model prediction component.

Referring to FIG. 6, a method of leveraging the discrepancies of a dialog process is illustrated. At 600, the dialog process receives speech/dialog data. Speech/dialog data is typically spoken commands and/or questions restricted to fixed, grammar-containing, pre-defined phrases, as well as predictive data based on systematic patterns of usage displayed by the user. At 602, the speech/dialog data is processed into predicted dialog data and recognized dialog data. At 604, the predicted and recognized dialog data are compared to generate difference data. Difference data represents the identified discrepancies between the predicted dialog data and the recognized dialog data (e.g., the difference in goals between the predicted data and the speech recognition result and/or a measure of reliability).

At 606, the difference data is processed to determine the degree of difference between the predictive dialog data and the recognized dialog data. The degree of difference between the predictive dialog data and the recognized dialog data determines the need for a dialog data repair. At 608, user feedback is utilized to update the difference data by repairing the predicted dialog data and/or the recognized dialog data. In this implementation, the component that compares the predicted and recognized dialog data to generate difference data is integral to the predicted dialog data in dialog process. By incorporating the component directly into the predicted dialog data, user feedback can be utilized to update modifiable parameters and structures of the predicted dialog data in an online fashion. At 610 the difference data is repaired via engaging in repairs of the predicted dialog data and/or the recognized dialog data based on direct user feedback.

Figure 7:
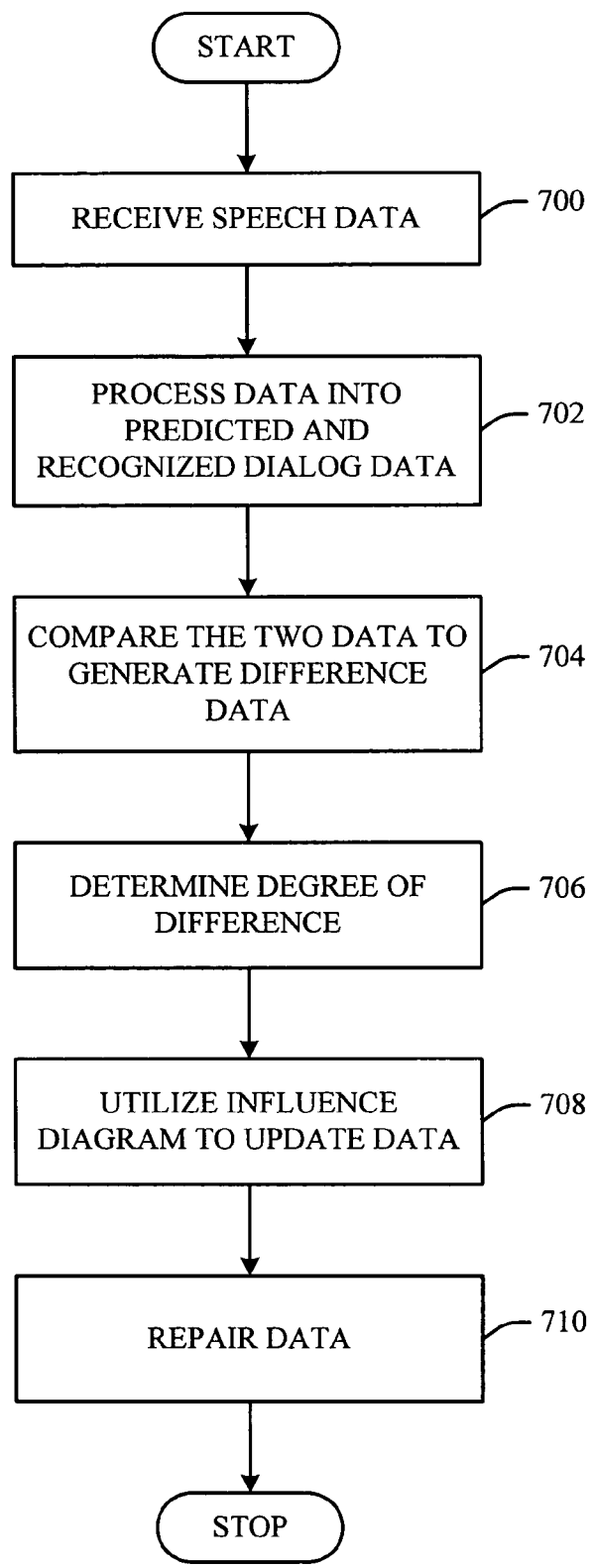
FIG. 7 illustrates a flow chart of a method of the dialog system utilizing an influence diagram.

Referring to FIG. 7, a method of leveraging the discrepancies of a dialog process is illustrated. At 700, the dialog process receives speech/dialog data. Speech/dialog data is typically spoken commands and/or questions restricted to fixed, grammar-containing, pre-defined phrases, as well as predictive data based on systematic patterns of usage displayed by the user. At 702, the speech/dialog data is processed into predicted dialog data and recognized dialog data. At 704, the predicted and recognized dialog data are compared to generate difference data. Difference data represents the identified discrepancies between the predicted dialog data and the recognized dialog data (e.g., the difference in goals between the predicted data and the speech recognition result and/or a measure of reliability). At 706, the difference data is processed to determine the degree of difference between the predictive dialog data and the recognized dialog data. The degree of difference between the predictive dialog data and the recognized dialog data determines the need for a dialog data repair.

At 708, an influence diagram can be utilized to determine whether the difference data generated from the predicted dialog data and/or the recognized dialog data should be updated and/or repaired. In this implementation, the influence diagram utilizes difference data to generate the reliability of the predicted and recognized data. By incorporating an influence diagram in the dialog process, the predicted and recognized data is analyzed for reliability based on errors and recorded differences. At 710 the difference data is repaired via engaging in repairs of the predicted dialog data and/or the recognized dialog data based on analysis of the influence diagram. The influence diagram depicted in FIG. 3 is representative of a subset of the model constructed using this process.

Figure 8:
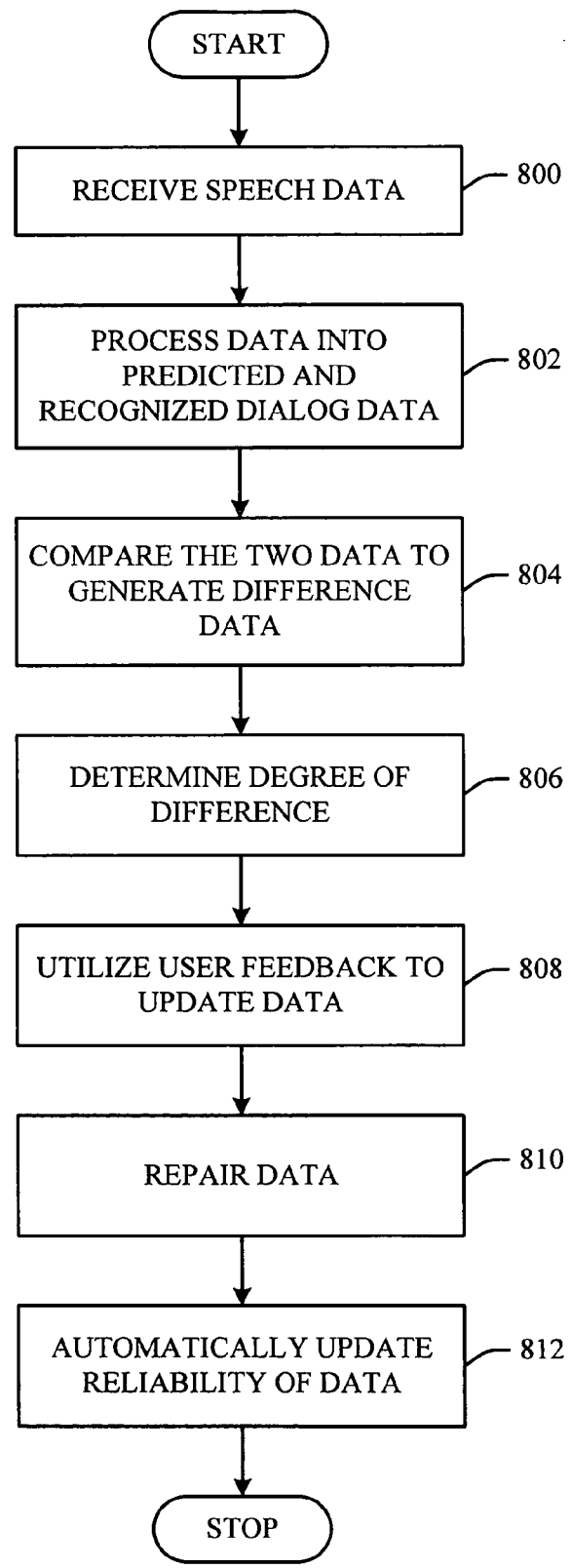
FIG. 8 illustrates a flow chart of a method of the dialog system further including the automatic updating of the reliability of the system.

Referring to FIG. 8, a method of leveraging the discrepancies of a dialog process is illustrated. At 800, the dialog process receives speech/dialog data. Speech/dialog data is typically spoken commands and/or questions restricted to fixed, grammar-containing, pre-defined phrases, as well as predictive data based on systematic patterns of usage displayed by the user. At 802, the speech/dialog data is processed into predicted dialog data and recognized dialog data. At 804, the predicted and recognized dialog data are compared to generate difference data. Difference data represents the identified discrepancies between the predicted dialog data and the recognized dialog data (e.g., the difference in goals between the predicted data and the speech recognition result and/or a measure of reliability). At 806, the difference data is processed to determine the degree of difference between the predictive dialog data and the recognized dialog data. The degree of difference between the predictive dialog data and the recognized dialog data determines the need for a dialog data repair.

At 808, user feedback is utilized to determine if the predictive dialog data and/or the recognized dialog data need to be updated. User feedback occurs as an expected consequence of taking a system action and is obtained in various ways, such as explicitly through a confirmation process, through a user's rejection of specific actions, implicitly through a tacit acceptance of actions, etc. The predictive dialog data and/or the recognized dialog data is also updated when the degree of difference meets a predetermined threshold value in order to repair the dialog data. A predetermined threshold value is set by the dialog process to determine when a dialog repair is needed. At 810, the dialog data is repaired via engaging in repairs of the predicted dialog data and/or the recognized dialog data. At 812, the dialog process automatically updates the reliability of the predicted dialog data and/or the recognized dialog data. Specifically, the process engages in a manual confirmation to automatically determine the reliability of the dialog data. User feedback is then elicited from the manual confirmation and employed to automatically update the reliability of the predicted dialog data and/or the recognized dialog data.

Figure 9:
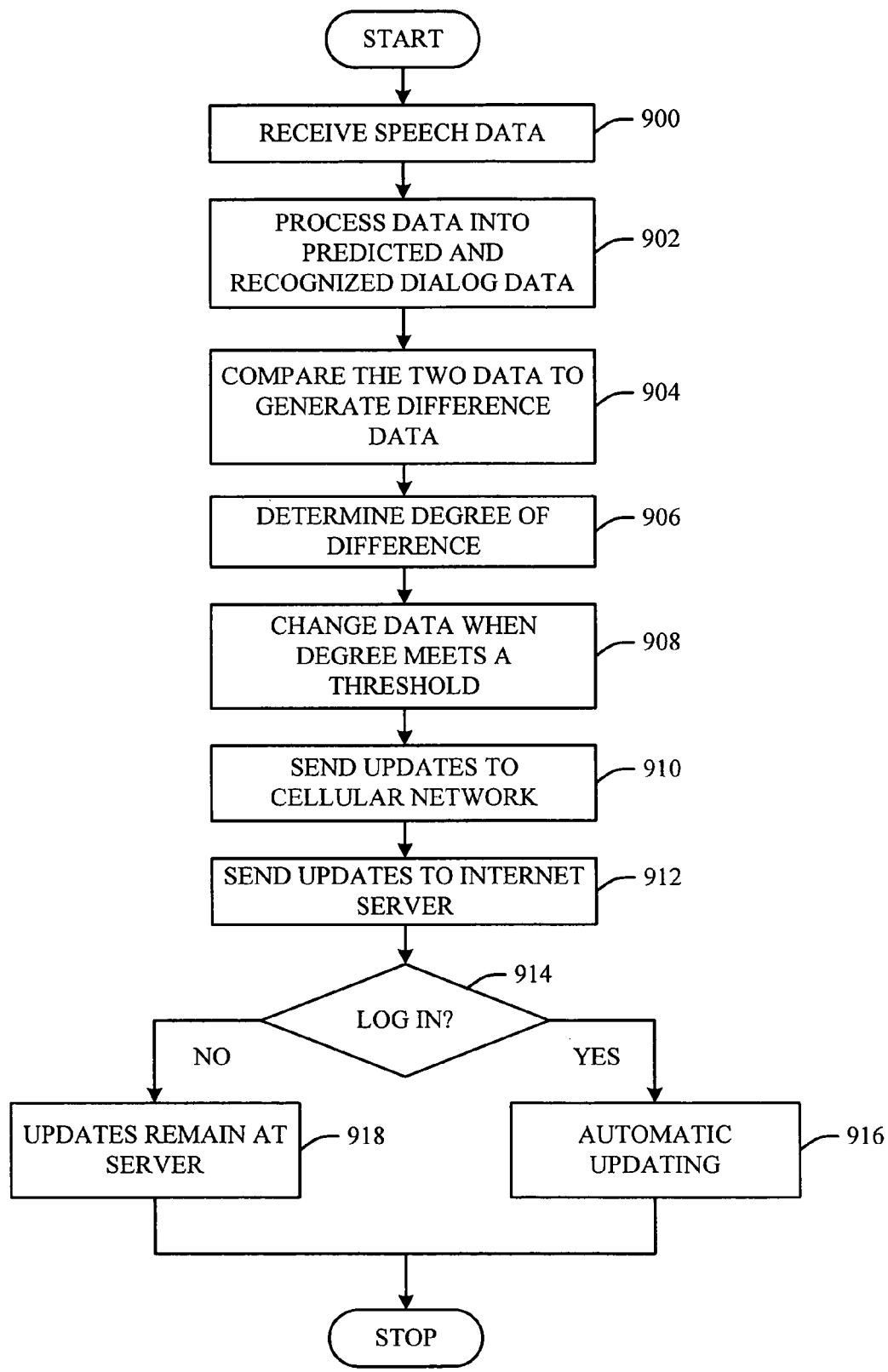
FIG. 9 illustrates a flow chart of a method of the dialog system further including the automatic updating of remote systems.

Referring to FIG. 9, a method of leveraging the discrepancies of a dialog process remotely located on a server, is illustrated. At 900, the dialog system receives speech/dialog data located on the user's mobile telephone, or any other mobile communication device. Speech/dialog data is typically spoken commands and/or questions restricted to fixed, grammar-containing, pre-defined phrases, as well as predictive data based on systematic patterns of usage displayed by the user. At 902, the speech/dialog data is processed into predicted dialog data and recognized dialog data. At 904, the predicted and recognized dialog data are compared to generate difference data. Difference data represents the identified discrepancies between the predicted dialog data and the recognized dialog data (e.g., the difference in goals between the predicted data and the speech recognition result and/or a measure of reliability).

At 906, the difference data is processed to determine the degree of difference between the predictive dialog data and the recognized dialog data. The degree of difference between the predictive dialog data and the recognized dialog data determines the need for a dialog data repair. At 908, the predictive dialog data and/or the recognized dialog data is changed when the degree of difference meets a predetermined threshold value in order to repair the dialog data. A predetermined threshold value is set by the dialog process to determine when a dialog repair is needed.

At 910, the dialog process automatically sends the updated dialog data to the cellular network. At 912, the updated dialog data is sent to an Internet server on the IP network. The server contains a dialog management system update service which stores and updates the user's other communication devices, such as desktops, laptops, PDA's, cell phone, etc. At 914, the user logs in to a communication device, different from the updated cellular telephone. If the user successfully logins, then at 916 the server automatically and remotely updates the communication device with the new dialog update data received from the cellular telephone. If the user is unsuccessful in logging in, then at 918 the new dialog update data remains at the server until a successful login is completed. Accordingly, the server receives update data from a communications device and stores the update data remotely till the user logs in on another communication device. Once the user logs in, the server pushes the update data to the new communication device for automatic updating.

Generally, every time the user logs into a new communication device, the server will push down the update data and automatically update the dialog data of the accessed communication device. Accordingly, a user does not have to manually update the dialog data for every communication device he or she owns, instead, the server stores the updates remotely and automatically performs updating at log in.

Figure 10:
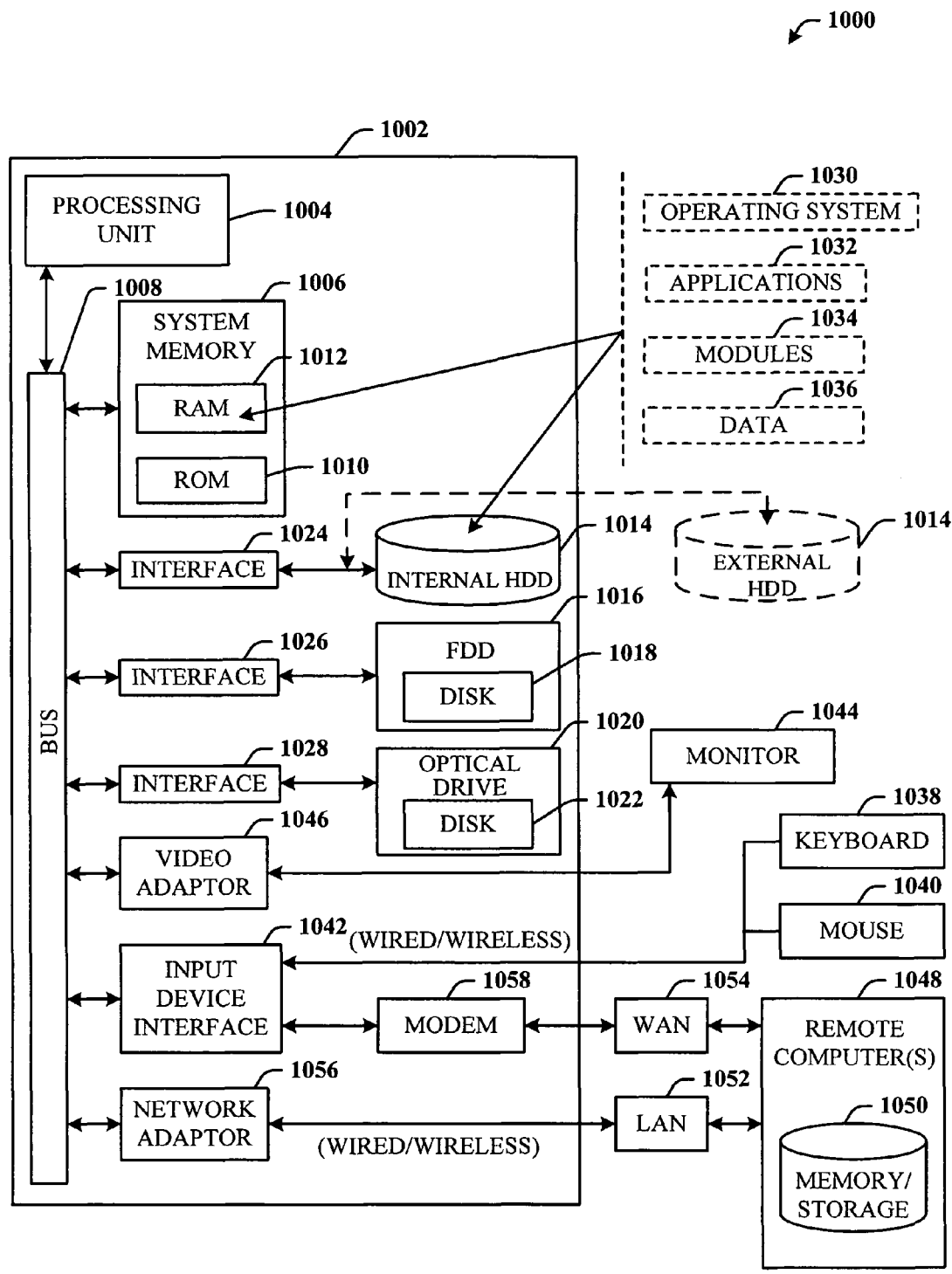
FIG. 10 illustrates a block diagram of a computer operable to execute the disclosed discrepancy leveraging architecture.

Referring now to FIG. 10, there is illustrated a block diagram of a computer operable to execute the disclosed discrepancy leveraging architecture. In order to provide additional context for various aspects thereof, FIG. 10 and the following discussion are intended to provide a brief, general description of a suitable computing environment 1000 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary environment 1000 for implementing various aspects includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1002 through one or more wired/wireless input devices (e.g., a keyboard 1038 and a pointing device, such as a mouse 1040). Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks (e.g., a wide area network (WAN) 1054). Such LAN and WAN networking environments are commonplace in offices and companies, and facilitate enterprise-wide computer networks, such as intranets, all of which may connect to a global communications network (e.g., the Internet).

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices (e.g., computers) to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
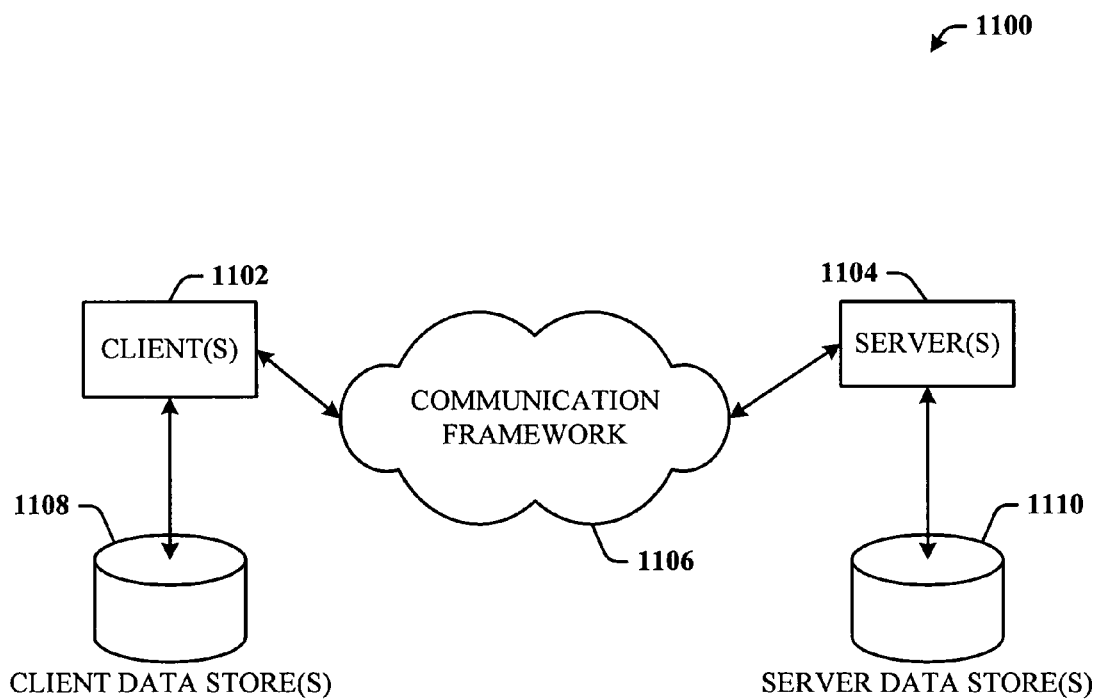
FIG. 11 illustrates a schematic block diagram of an exemplary computing environment for use with the dialog system.

Referring now to FIG. 11, there is illustrated a schematic block diagram of an exemplary computing environment 1100 in accordance with another aspect. The system 1100 includes one or more client(s) 1102. The client(s) 1102 can be hardware and/or software (e.g., threads, processes, computing devices). The client(s) 1102 can house cookie(s) and/or associated contextual information by employing the subject innovation, for example.

The system 1100 also includes one or more server(s) 1104. The server(s) 1104 can also be hardware and/or software (e.g., threads, processes, computing devices). The servers 1104 can house threads to perform transformations by employing the invention, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for repairing dialog data, comprising:
   a discrepancy detection component that:
   identifies discrepancy data between predictive dialog data output from a user model prediction component and recognized dialog data output from a speech recognition component, the predictive dialog data being a prediction of an action a user will pursue based on patterns of non-verbal actions by the user, and the recognized dialog data being based on a spoken command by the user;
   compares the predictive dialog data and the recognized dialog data to generate difference data;
   processes the difference data to determine a degree of difference between the predictive dialog data and the recognized dialog data; and
   changes at least one of the predicted dialog data, the recognized dialog data, and a potential action based in part on optimization of a specific system action, the optimization being based on a utility function that comprises a chance variable, a decision variable, and a value variable; and
   a dialog repair component that repairs the dialog data based in part on the discrepancy data.

2. The system of claim 1, wherein the discrepancy data is based on a measure of reliability, the measure of reliability is at least one of probability, confidence score, and potential functions.

3. The system of claim 1, wherein at least one of the predicted dialog data and the recognized dialog data are treated as expert opinions.

4. The system of claim 3, wherein the dialog repair component processes user feedback to weight one expert opinion more than another expert opinion, and initiates confirmation processing based in part on the discrepancy data.

5. The system of claim 1, wherein the discrepancy detection component is integral to the user model prediction component.

6. The system of claim 5, wherein the dialog repair component looks for user feedback to update modifiable parameters and structures of the user model prediction component in an online fashion.

7. A computer-implemented method for leveraging discrepancies between user model predictions and speech recognition results for repairing dialog data, comprising:
   processing speech data into predicted dialog data and recognized dialog data, the predictive dialog data being a prediction of an action a user will pursue based on patterns of non-verbal actions by the user, and the recognized dialog data being based on a spoken command by the user;
   comparing the predictive dialog data and the recognized dialog data to generate difference data;
   processing the difference data to determine a degree of difference between the predictive dialog data and the recognized dialog data; and
   changing at least one of the predicted dialog data, the recognized dialog data, and a potential action based in part on optimization of a specific system action, the optimization being based on a utility function that comprises a chance variable, a decision variable, and a value variable.

8. The method of claim 7, further comprising processing the difference data based on a confidence score that at least one of the predictive dialog data is correct, the recognized dialog data is correct or both the predictive dialog data and the recognized dialog data are incorrect.

9. The method of claim 7, further comprising generating weighted dialog data for at least one of the dialog data predicted by a user model and the dialog data recognized by a speech recognizer and initiating user confirmation to change the weighted dialog data.

10. The method of claim 7, further comprising processing the repaired dialog data into human understandable speech signals.

11. The method of claim 7, further comprising automatically updating reliability of at least one of the predicted dialog data and the recognized dialog data through user feedback as obtained for instance through a manual confirmation process.

12. The method of claim 7, further comprising deriving the predicted dialog data as a function of the received speech data.

13. The method of claim 7, further comprising updating a predictive user model based on a detected user response.

14. The method of claim 7, further comprising deriving the recognized dialog data based solely on acoustic information in the received speech data.

15. The method of claim 7, further comprising incorporating the difference data into an influence diagram to determine a degree of difference between the predictive dialog data and the recognized dialog data.

16. The method of claim 7, further comprising updating the reliability of at least one of a predictive user model and a speech recognizer according to feedback elicited from a user.

17. The method of claim 7, further comprising utilizing feedback to learn if a predictive user model or a speech recognizer is correct, wherein feedback occurs as an expected consequence of taking a system action and includes at least one of an explicit user action and a tacit acceptance of an action.

18. A computer-implemented method for repairing dialog data in a speech application, comprising:
   identifying discrepancy data between predictive dialog data output from a predictive user model component and recognized dialog data output from a speech recognition component, the predictive dialog data being a prediction of an action a user will pursue based on patterns of non-verbal actions by the user, and the recognized dialog data being based on a spoken command by the user, and the user model component and the speech recognition component each including a plurality of modifiable parameters and structures;
   comparing the predictive dialog data and the recognized dialog data to generate difference data;

processing the difference data to determine a degree of difference between the predictive dialog data and the recognized dialog data; and changing at least one of the predicted dialog data, the recognized dialog data, and a potential action based in part on optimization of a specific system action, the optimization being based on a utility function that comprises a chance variable, a decision variable, and a value variable.

19. The method of claim 18, further comprising treating the dialog data output predicted by the predictive user model component and the dialog data output recognized by the speech recognition component as expert opinions, and utilizing user feedback elicited from the dialog repair process to weight one expert opinion more than another expert opinion.

* * * * *